United States Patent [19]
Svancarek et al.

[11] Patent Number: 5,935,224
[45] Date of Patent: Aug. 10, 1999

[54] METHOD AND APPARATUS FOR ADAPTIVELY COUPLING AN EXTERNAL PERIPHERAL DEVICE TO EITHER A UNIVERSAL SERIAL BUS PORT ON A COMPUTER OR HUB OR A GAME PORT ON A COMPUTER

[75] Inventors: Mark K. Svancarek; Jeffrey S. Hanson, both of Redmond, Wash.; Toshiyuki Minami, Sagamihara, Japan

[73] Assignee: Microsoft Corporation, Redmond, Wash.

[21] Appl. No.: 08/845,273

[22] Filed: Apr. 24, 1997

[51] Int. Cl.$^6$ .............................. G06F 13/00; G06F 3/00
[52] U.S. Cl. ................................ 710/63; 710/65; 463/36
[58] Field of Search ..................................... 395/883, 885; 710/63, 65; 463/36

[56] References Cited

U.S. PATENT DOCUMENTS

| | | | |
|---|---|---|---|
| 4,716,527 | 12/1987 | Graciotti | 364/200 |
| 5,134,395 | 7/1992 | Stern | 341/20 |
| 5,513,302 | 4/1996 | Tsai | 395/114 |
| 5,628,686 | 5/1997 | Svancarek et al. | 463/36 |
| 5,714,981 | 2/1998 | Scott-Jackson et al. | 345/161 |
| 5,717,428 | 2/1998 | Barrus et al. | 345/168 |
| 5,754,890 | 5/1998 | Holmdahl et al. | 395/883 |
| 5,784,581 | 7/1998 | Hannah | 395/290 |

*Primary Examiner*—Thomas C. Lee
*Assistant Examiner*—Albert Wang
*Attorney, Agent, or Firm*—Ronald M. Anderson

[57] ABSTRACT

An adapter or converter for coupling an external device to a universal serial bus (USB) port. An adapter is disclosed for use in connecting a joystick to the USB port of a computer. The adapter includes a receptacle for coupling with a game port plug on the joystick. The receptacle is connected to a USB plug, which can be mated with the USB port on a hub or a computer. Within the joystick, a programmed microcontroller unit (MCU) responds to an indication of whether the joystick is connected to the adapter and if so, operates the joystick in a USB communication mode, providing the required digital data packets formatted in accordance with the USB specification. Otherwise, the joystick operates in a game port mode to communicate with a conventional game port. A broader aspect of the present invention is directed to a converter that enables an external device normally connected to a computer through a non-USB port to communicate with the computer via a USB port. The converter includes a data acquisition interface, a microcontroller, a USB engine, and a USB transceiver. Signals from the peripheral device are converted to the appropriate format for input through the USB port, and any signals transmitted to the peripheral device from the USB port are converted to the format it requires by the data acquisition interface.

19 Claims, 6 Drawing Sheets

METHOD AND APPARATUS FOR ADAPTIVELY COUPLING AN EXTERNAL PERIPHERAL DEVICE TO EITHER A UNIVERSAL SERIAL BUS PORT ON A COMPUTER OR HUB OR A GAME PORT ON A COMPUTER

FIELD OF THE INVENTION

The present invention generally pertains to connecting an external peripheral device to a port on a computer, and more specifically, to a method and apparatus for adaptively connecting a joystick or other external peripheral device to a universal serial bus (USB) port of a computer wherein the device does not include a connector adapted to mate with the USB port.

BACKGROUND OF THE INVENTION

On a conventional personal computer, a number of different data ports are typically provided to enable data transfer and communication between the computer and external peripheral devices, such as a printer, a scanner, a backup tape drive, a keyboard, a pointing device (e.g., a mouse or trackball), a modem, etc. The typical personal computer includes a keyboard port (DIN or PS/2 style), two serial (RS-232) ports, a parallel port, a game port (for connecting a joystick), and perhaps a PS/2 port for connecting a mouse or other pointing device, although one of the serial ports may instead be used for this purpose. Due to the number of different types of external devices that are available to connect to a computer, it is not uncommon for a user to find that the required ports are already in use. Even with plug and play options, the user may find that the interrupts, addresses, or other parameters required by a new peripheral device are already in use so that it cannot readily be connected to the computer.

To address these problems, and more importantly, to improve the data transfer speed between peripheral devices and the computer data bus, the USB has been developed and will soon be available on new computers. The USB is a new type of port and data communication protocol that will permit a plurality of newly designed peripheral devices to be connected to the computer in a daisy chain configuration. For example, a new keyboard designed to take advantage of this technology will have a cord with a four-pin USB plug that is adapted to mate with the USB receptacle or port on a new personal computer. A cord connected to a new USB-ready mouse or other pointing device will include a USB plug adapted to mate with a corresponding USB receptacle on the back of the keyboard, thereby daisy-chaining the mouse to the keyboard to the computer. The USB specification provides for packets of data transmitted from such a keyboard or from such a pointing device to be received and routed to the appropriate driver in the computer. Additional USB-ready peripherals can also be connected in a daisy chain arrangement, and USB hubs will be available to expand the number of peripherals that are connected to the USB port on the computer.

As is always the case when any new technology becomes available that improves on what was previously available, the USB port will not be available on all new computers that are sold, and for some time, computers having the new technology will be in the minority compared to those that do not have a USB port. If a user purchases a USB-ready peripheral device for use with a new computer having a USB port, the device will not be usable on an older computer that only includes the conventional serial, parallel, or other port previously used for connecting such a device to the computer.

This problem is particularly evident in regard to joysticks and other game control devices that normally are connected to the game port. The game port (or IBM™ Game Control Adapter) was developed during the early 1980s to connect joysticks to the personal computer and is still commonly used for this purpose. Literally millions of legacy computers exist that include a game port for this purpose. Clearly, a manufacturer of joysticks might understandably be somewhat reluctant to produce a joystick that only will connect to the USB port, because the market for such joysticks will initially be too small to justify the expense. Clearly, it would be desirable to produce a joystick or other peripheral device that can optionally be used with either the new USB port or alternatively, with the conventional port of the type currently used to couple that device to an older (legacy) personal computer.

Another problem arises because of all of the legacy peripheral components that are not designed to transfer data (sometimes bidirectionally) in accord with the USB specification, but which may be otherwise usable with new computers that include a USB port. A user who purchases a new computer that includes a USB port may want to use existing peripheral components previously used with an older non-USB capable computer with the new computer. However, older peripheral do not include a USB engine or USB transceiver that would enable communication with a USB port. To enable this option, a converter to couple the legacy peripheral component to the four-pin USB port of the new computer, and more importantly, to permit the device to communicate with the computer by converting data from the device to the required USB format and converting USB data from the computer to the format required by the device. For example, a printer designed to connect to and communicate with a conventional serial port on a computer would need the converter to convert the RS-232 format data into packetized digital data in the USB format, and any control signal provided to the printer by the computer over the USB port would need to be converted back into the serial data format. Each type of legacy device might require a data interface in the converter that is specific to the type of port to which the peripheral device is normally coupled. Also, it would be desirable to provide a converter that serves to couple a plurality of the same or different types of legacy peripheral devices to the USB port, handling the data flow to and from each device via the USB port as required. Currently, such a converter does not exist.

SUMMARY OF THE INVENTION

In accordance with the present invention, an adapter is defined for use in coupling a game control to a USB port on a computer or on a USB hub. The game control has a lead on which is mounted a connector plug specifically adapted to couple to a game port receptacle on a computer. The adapter includes a game port receptacle that is adapted to connect to the connector plug mounted on the lead of the game control. This game port receptacle is electrically connected to a USB plug adapted to connect to the USB port. Means are included for providing an indication that the connector plug mounted on the lead of the game control is coupled to the adapter. The game control responds to the indication by transferring data in a format required by the USB port. Otherwise, the game control transfers data in a format required by the game port of the computer.

The adapter preferably further comprises a lead connecting the game port receptacle to the USB plug, although the game port receptacle on the adapter can alternatively be connected directly to the USB plug without an intervening lead.

In one embodiment of the adapter, the means for providing an indication preferably comprises a shorting conductor disposed within either the game port receptacle or the USB plug. The shorting conductor electrically couples two lines within the lead from the game control together in a shorted relationship. These two lines are otherwise unused during transfer of the data to the USB port from the game control.

In an alternative embodiment of the means for providing the indication of the connection of the game control to the adapter, the indication is a voltage on a line in the lead connected to the game control. In this embodiment, the means for providing the indication comprise an impedance in the adapter. This impedance (to ground) determines the voltage on the line in the lead, wherein the voltage is at one level if the game port plug on the lead is connected to the game port receptacle of the adapter, but changes substantially if the game port plug on the lead is instead connected to the game port receptacle on the computer.

In yet another embodiment, the means for providing the indication comprise a line in the lead connected to the game control that conveys an initial signal received from either the game port on the computer or from the USB port, after the game control is reset or re-energized. The format of this signal provides the indication. Thus, if the game control is reset and the first signal it receives is a USB reset, the game control will know that it is connected to the USB port. Conversely, if the first signal received is a game port interrupt, the game control will detect that it is connected to the game port of the computer.

Another aspect of the present invention is directed to a game control that automatically operates in a game port mode when coupled to a game port of a computer, and in a USB port mode when coupled to the USB port of a hub or of a computer. In addition to the adapter discussed above, the game control includes a programmed controller. The programmed controller responds to a signal on the line of the game control indicating that the adapter is coupled to the game port plug on the lead of the game control, by operating the game controller in the USB mode. Otherwise, the programmed controller operates the game controller in the game port mode. The game control further comprises a USB transceiver that is selectively employed by the programmed controller for transferring data through the USB port when operating the game control in the USB mode.

Another aspect of the invention is directed to a method for selectively operating a game control in a USB mode to transfer data to a USB port of a hub or of a computer, or in a game port mode, to transfer data to a game port of a computer. This method is generally consistent with the adapter and game control discussed above.

A still further aspect of the present invention is directed to a converter for enabling an external computer peripheral device that is designed to connect to a non-USB port of a computer via a cable and a plug attached to the cable for data transfer, to instead connect to a USB port on a hub or on a computer for data transfer. The converter includes a receptacle adapted to mate with the plug on the cable attached to the peripheral device, and a lead that is attached to a USB port plug adapted to mate with the USB port. A USB transceiver is provided for sending and receiving data respectively to and from the USB port. Data interface means are included for changing a form in which data are received from the peripheral device to a form readable by and compatible with the USB port, and for modifying data received from the USB port to a form that is readable by and compatible with the peripheral device. A programmed controller coupled to the USB transceiver and to the data interface means controls the exchange of data between the peripheral device and the USB port. The converter thus enables a printer or other peripheral device, which normally couples to a parallel port of other port on a computer, to be connected to a USB port on the computer or on a USB hub.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

Figure 1:
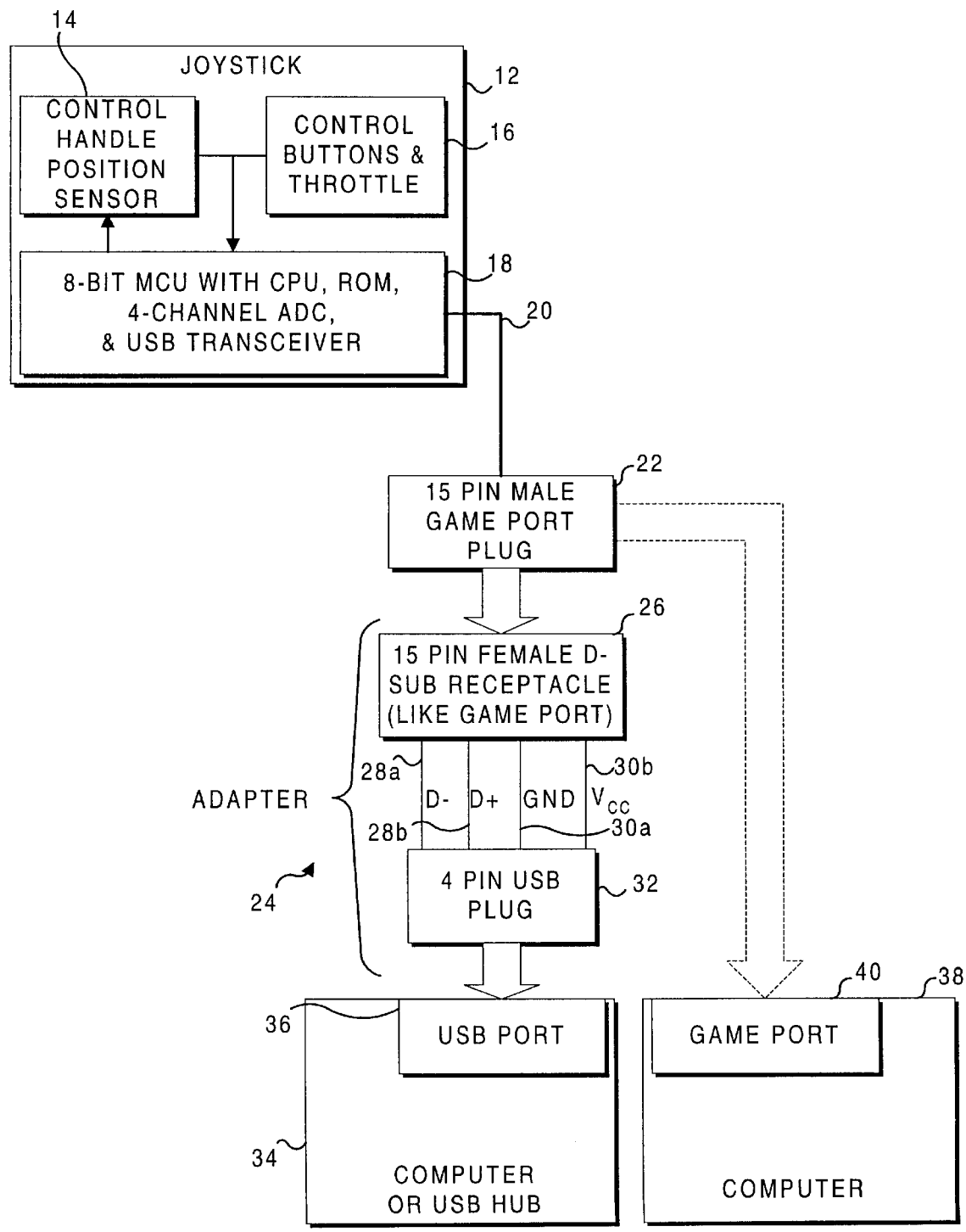
FIG. 1 is a block diagram of a first preferred embodiment of the present invention that enables a game controller to couple to either a game port or a USB port on a personal computer.

A first embodiment of the present invention is illustrated in FIG. 1. This embodiment is applied to a joystick 12 that is used for playing computer games and for controlling the position of a cursor or graphic characters on a display of a conventional computer. Joystick 12 includes a control handle position sensor 14 that monitors the angular and rotational orientation of the control handle relative to a pivot point, producing a sensor signal indicative of the handle position. Details of the joystick are not shown, since they do not specifically relate to the present invention. In addition to a control handle and related position sensor 14, joystick 12 includes a plurality of control buttons and a throttle, as indicated in a block 16. The control buttons and throttle produce corresponding signals relative to their state, which along with the signal indicative of the control handle position produced by the sensor are input to a programmed 8-bit microcontroller unit (MCU) 18. Although not separately shown, the MCU includes a central processing unit (CPU), a read only memory (ROM), a 4-channel analog-to-digital converter (ADC), and a USB transceiver. All of these elements are preferably provided in a single integrated circuit (IC); several such ICs are currently commercially available in anticipation of the expected market for computer peripheral products that are being designed to communicate with the USB port of a computer or with a USB hub.

As noted above in the Background of the Invention, the initial market for USB peripheral products will likely be relatively small, since computers that include the USB port are relatively few in number compared to those with more conventional (legacy) data ports. Accordingly, joystick 12 will more often be purchased to connect to a game port than for use with a computer that has a USB port.

Joystick 12 thus includes a cable 20 that is terminated in a 15-pin male game port plug 22, which is adapted to couple with an IBM™ game adapter or game port (as it is more conventionally known) 40 on a computer 38, as shown in the Figure. All of the lines in cable 20 are used when the joystick is connected to the game port. A dashed line extends from game port plug 22 to game port 40 in the Figure to indicate that the joystick can optionally be connected to the game port, instead of to a computer or a USB hub 34.

The computer or USB hub is provided with a USB port 36. Game port plug 22 will not directly mate with USB port 36, because the USB port has an entirely different pin configuration and shape than game port 40. Instead, an adapter 24 connects joystick 12 to USB port 36. Adapter 24 includes a 15-pin female "D" receptacle 26, which is generally identical to game port 40 in terms of its shape and pin configuration, so that it readily receives game port plug 22 in a mating connection. Adapter 24 also includes a 4-pin USB plug 32 configured to mate with USB port 36.

Depending upon the method selected, either one or two of the lines contained with cable 20 are used to enable MCU 18 to determine whether game port plug 22 is coupled to the adapter or to the game port. When game port plug 22 is mated with adapter 24, two lines (D+ and D−) in cable 20 are employed for conveying data packets in the USB format between the joystick and USB port 36 through adapter 24. USB plug 32 is connected to receptacle 26 via lines 28a and 28b through which data signals are conveyed, and lines 30a and 30b, which respectively connect to ground and +5 volts.

In addition to coupling the joystick to the USB port, the adapter must also provide some means to enable MCU 18 to determine whether to operate in a game port communication mode or in a USB communication mode. Clearly, when joystick 12 is connected to the game port, the game port communication mode should be used by MCU 18, and conversely, when connected to the USB port via the adapter, the USB communication mode should be used. The present invention contemplates three different approaches for providing an indication to MCU 18 of whether the joystick is connected to the game port or to the USB port (via adapter 24). In response to this indication, MCU 18 selectively employs its USB transceiver to communicate with USB port 36 or produces the signals in the format required by the game port.

Figure 2A:
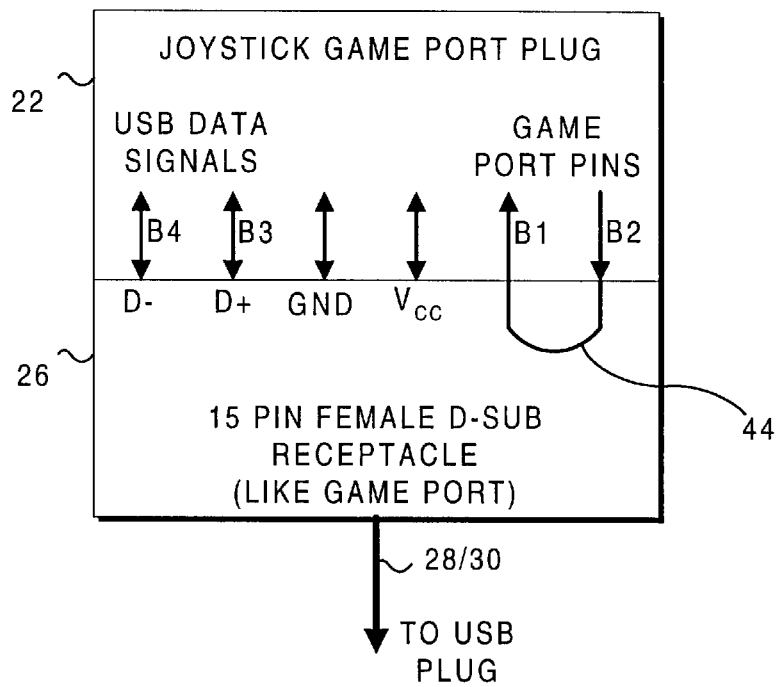
FIG. 2A is a block diagram of a game port receptacle on an adapter mated to a game port plug on the lead from a game controller, showing a first preferred approach for detecting the adapter.

FIG. 2A illustrates a first preferred technique that is used to provide the indication to MCU 18 that adapter 24 is being used to couple the joystick to USB port 36. Inside receptacle 26, a shorting wire 44 couples two of the 15 pins of the receptacle together, thereby creating a short between two of the lines in cord 20 when plug 22 is mated with receptacle 26. Although other lines in cord 20 could be used for this purpose, the preferred embodiment uses shorting wire 44 to connect lines B1 and B2 of the cord together. These two lines are respectively connected to pins 10 and 14 of game port plug 22. When game port plug 22 is connected to game port 40, lines B1 and B2 are not connected together. Accordingly, MCU 18 can detect when game port plug 22 is plugged into receptacle 26 on adapter 24 by detecting a short between the two game port lines B1 and B2. When continuity between these two lines is detected, MCU 18 switches to the USB data communication mode and employs the onboard USB transceiver to process data packets that are transferred through cord 20 over the two USB lines and through adapter 24, to or from USB port 36. So long as a short is not detected between lines B1 and B2 (or alternatively, any other two available lines in cord 20), MCU 18 continues to operate in the game port mode, processing data signals that are conveyed over the four game port lines in cord 20 in the format employed by game port 40.

Figure 4:
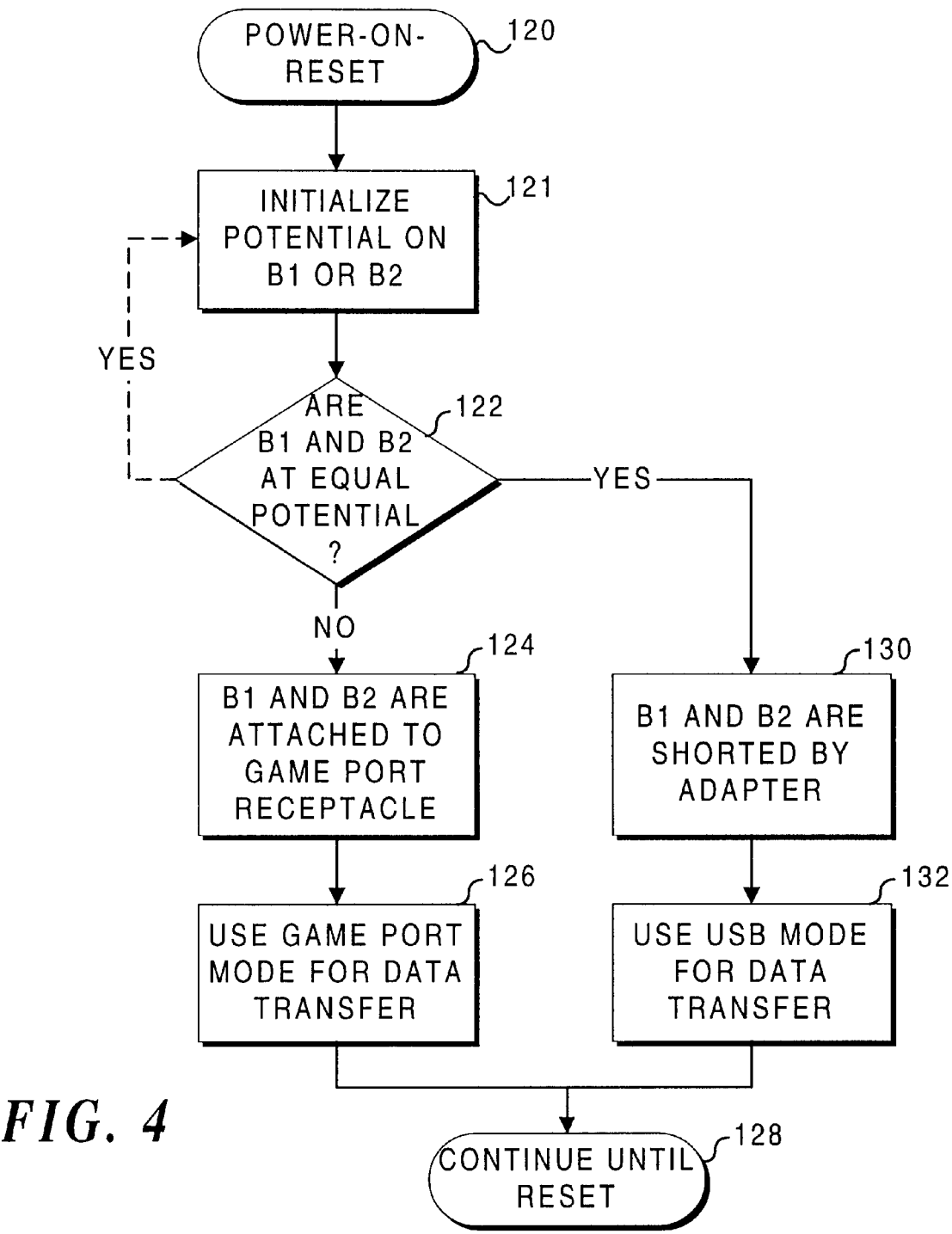
FIG. 4 is a flow chart showing the logic employed in the embodiment of FIG. 2A for determining whether the game controller is coupled to the game port of a computer or to the USB port.

The logic for the first technique employed to determine whether adapter 24 is in use for coupling joystick 12 to USB port 36 is illustrated in FIG. 4. Following a power-on reset, or after the joystick is re-energized, a block 121 indicates that MCU 18 drives one of lines B1 and B2 to the a desired potential, and as noted in a decision block 122, determines whether the potential on lines B1 and B2 is then equal. Preferably, the MCU will first drive the line one line to V+, check for equal potential on both lines, then ground the line that was previously coupled to V+, and again check the other of B1 and B2 to determine if the two lines are at the same potential. If not (in both cases), as indicated in a block 124, it will be apparent that lines B1 and B2 are attached to game port receptacle 40 and, as indicated in a block 126, the game port mode should be used for data transfer by MCU 18.

Alternatively, if MCU 18 determines that lines B1 and B2 are equal in potential, a block 130 concludes that lines B1 and B2 are shorted by adapter 24. Thus, MCU 18 will use the USB mode for data transfer, as indicated in a block 132. Following either blocks 126 or 132, the logic proceeds to a block 128, which provides that the current data transfer mode continues until the next reset occurs.

Figure 2B:
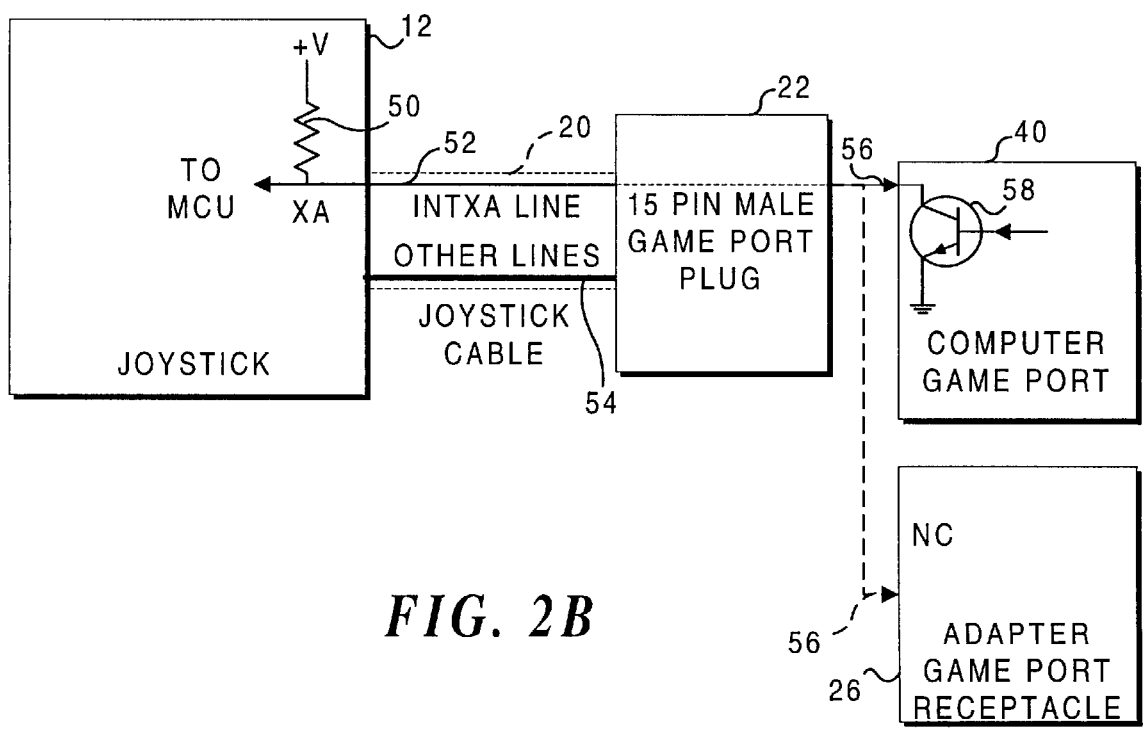
FIG. 2B is a block diagram of the game controller showing a second approach for detecting the adapter.

Shorting lead 44 adds a slight cost to adapter 24. Instead of using shorting lead 44, an indication can instead be provided to MCU 18 that adapter 24 is being used by one of two alternative techniques. FIG. 2B illustrates how a pull-up resistor 50 is coupled between the +V voltage supply within joystick 12 and the XA line; the XA line is also coupled to MCU 18 within joystick 12. Joystick cable 20 includes an INTXA line 52 that is an extension of line XA and which is coupled to a pin 56 in game port plug 22. When game port plug 22 is mated with game port 40, pin 56 connects the INTXA line in the cord to the collector of an NPN transistor 58, which is disposed in the game port circuit in the computer. Transistor 58 is only de-energized when a game or other application sets its base potential low while actively checking for data from the game control. When an application is not checking for data on the game port, the base-emitter impedance of transistor 58 to ground is relatively low, causing the transistor to be saturated, and further causing the collector-emitter voltage to be very low, so that line XA in the joystick is effectively grounded when the joystick is connected to game port 40. However, when game port plug 22 is instead plugged into receptacle 26 on adapter 24, the terminal for pin 56 within game port receptacle 26 is not connected, so that the potential on line XA within joystick 12 floats. MCU 18 detects the voltage on line XA and selects the USB communication mode when the voltage is approximately equal to +V and the game port communication mode when the voltage on line XA is near zero volts.

Figure 5:
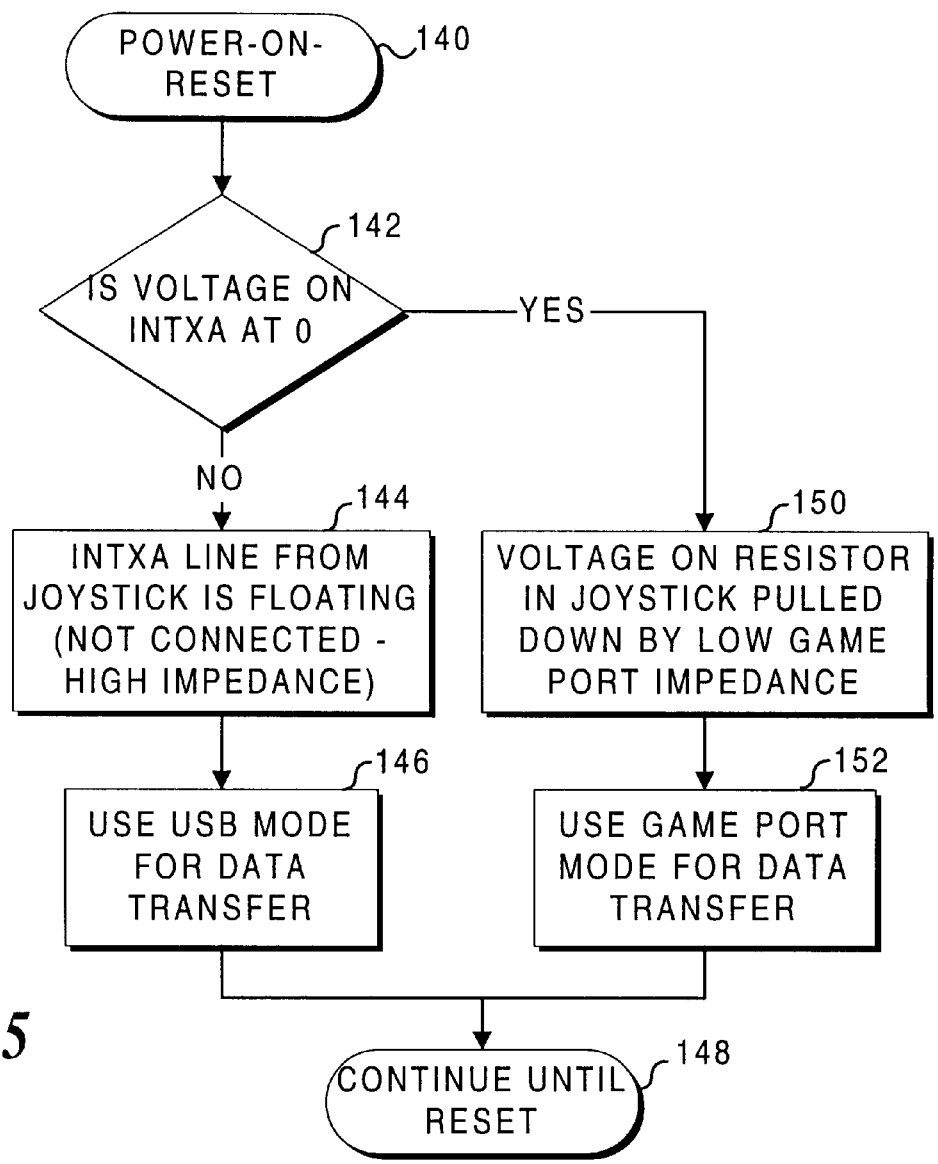
FIG. 5 is a flow chart showing the logical steps employed in the embodiment of FIG. 2B for determining whether the game controller is coupled to the game port of a computer or to the USB port.

FIG. 5 illustrates the logic employed in the second technique for determining the communication mode in which to operate joystick 12. A block 140 indicates that the routine starts with a power-on reset (or begins after the joystick is energized). Next, a decision block 142 determines if the voltage on the INTXA line of cord 20 is equal to zero volts. If not, the INXTA line from the joystick is "floating" instead of grounded, or if connected, is across a relatively high impedance to ground. Therefore, as indicated in a block 146, MCU 18 uses the USB mode for data transfer.

Conversely, if the determination in decision block 142 indicates that the voltage on INTXA is approximately zero, a block 150 determines that the voltage provided through the resistor in the joystick has been pulled down by a low impedance to ground in the game port. Therefore, as indicated in a block 152, MCU 18 uses the game port communication mode for data transfer. Following either block 146 or block 152, the USB communication mode or game port communication mode last selected is continued until the next reset occurs, in accordance with a block 148.

The third technique for determining in which communication mode to operate joystick 12 is simply to wait for either a change in the signal on the XA line, or a USB reset signal arriving on one of the other lines 54 in cable 20. Whichever signal is first detected by MCU 18 in joystick 12 determines the communication mode in which MCU 18 operates. Thus, if a game port interrupt signal causes the XA line potential to change, MCU 18 can determine that the joystick is connected to the game port, while if the USB reset signal is seen first, it will be apparent that adapter 24 is being used to couple the joystick to USB port 36. It should also be noted that one of the other game port lines could be used instead of the XA line. For example, the YA line (pin 6 in game port plug 22) could be used. In addition, either the XB or YB lines, which are respectively connected to pins 11 and 13 in game port plug 22, could be used for detecting whether the joystick is connected to the game port of computer 36. The voltage on any of these other lines YA, XB, and YB can also be detected in the third technique, to determine whether game port plug 22 is attached to computer game port 40 or to receptacle 26 on adapter 24, and thus to enable MCU 18 to determine in which communication mode to operate.

Figure 6:
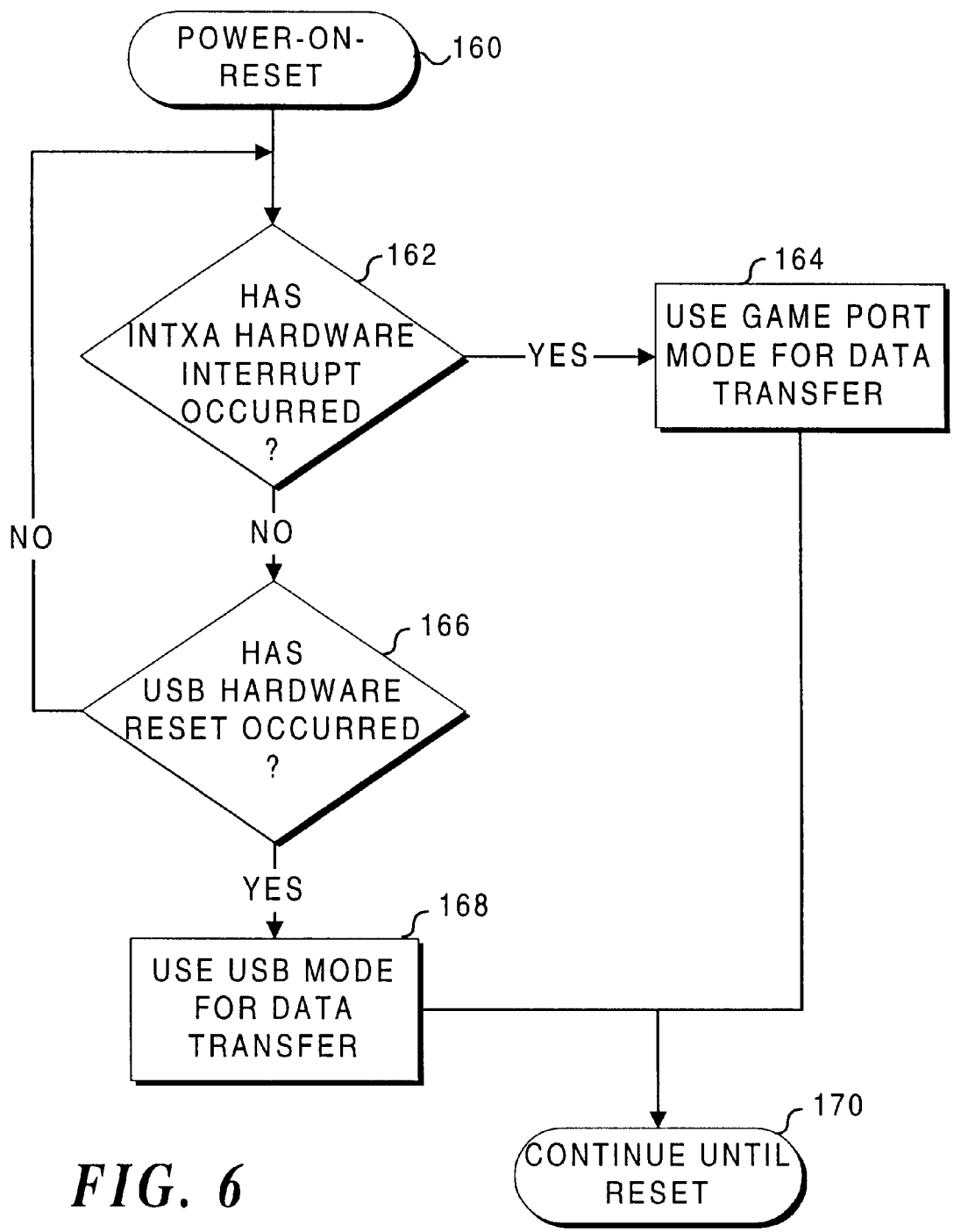
FIG. 6 is a flow chart showing the logical steps employed in a third embodiment for determining whether the game controller is coupled to the game port of a computer or to the USB port.

The logic for the third technique employed for detecting whether adapter 24 is in use also starts with a power-on reset in a block 160, as shown in FIG. 6. Next, a decision block 162 determines if an INTXA game port interrupt has occurred, and if so, MCU 18 uses the game port mode for data transfer. If not, a decision block 166 determines if a USB hardware reset has occurred. If not, the logic loops back to decision block 162. Otherwise, a block 168 provides for using the USB communication mode for data transfer. Following either blocks 164 or 168, the logic proceeds with a block 170, continuing the communication mode last selected until the next reset.

Figure 3:
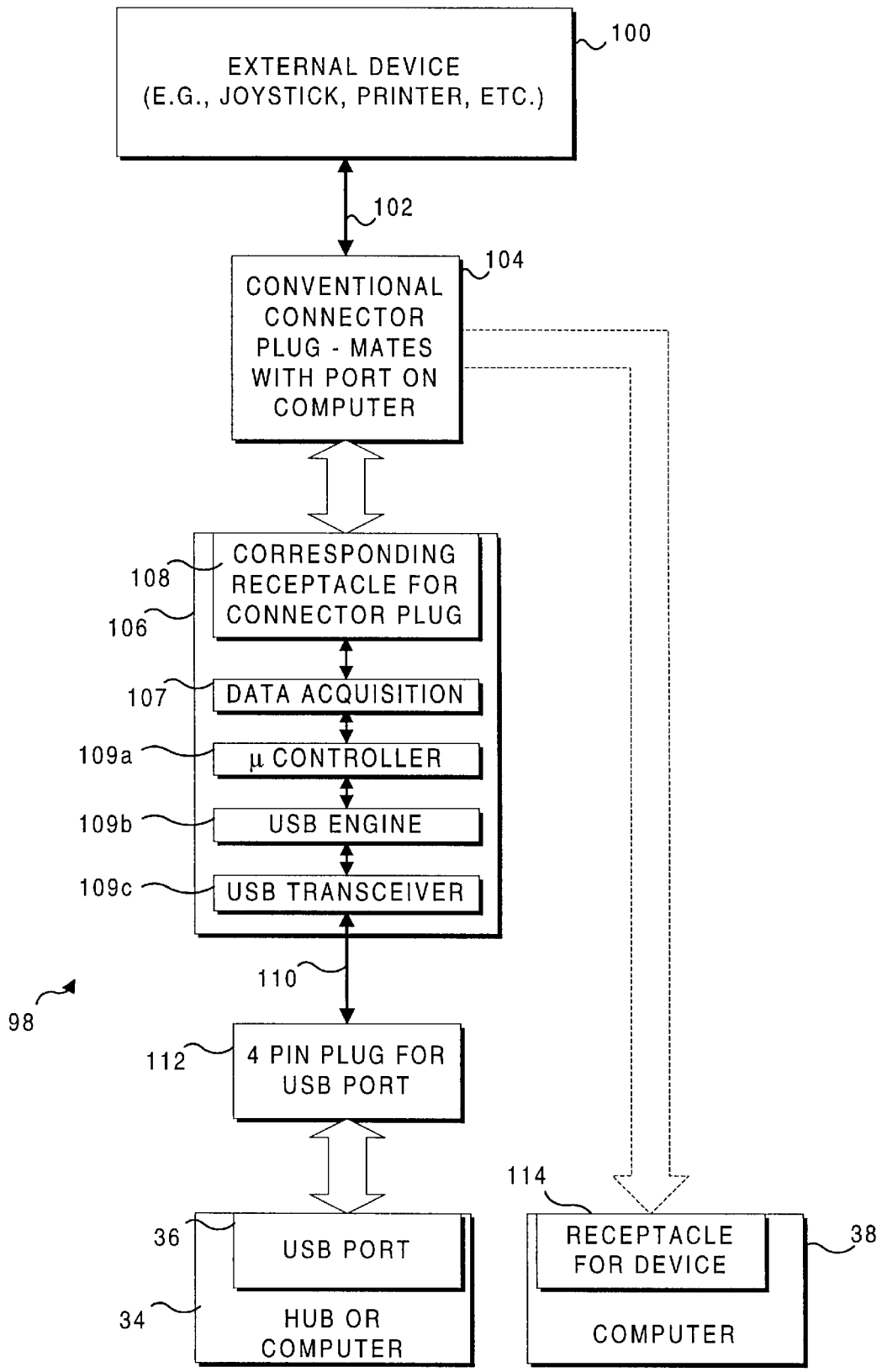
FIG. 3 is a block diagram showing a converter used to couple an external device that is designed to connect to a non-USB port on a computer to a USB port, in accord with the present invention.

Joystick 12 has the advantage of being designed to selectively operate either in the game port communication mode or the USB communication mode and is capable of communicating signals to the game port or to the USB port in the appropriate format for the selected mode. In contrast, legacy devices that have been designed before the advent of the USB port can only communicate and exchange data with one of the more conventional ports on older computers, such as a parallel port, PS/2 port, or serial port. For such legacy devices, adapter 24 cannot be used to enable the device to communicate with USB port 36, since the legacy external devices are incapable of providing or receiving the USB signal. For such legacy devices, a converter must be provided that can couple to the external legacy device by providing an appropriate receptacle to mate with the connector plug on a cord connected to the external device, connect to a USB port through an appropriate 4-pin USB plug, and exchange data with the external device, converting data received from the external device to the format required by the USB port and data received from the USB port to the format required by the external device. FIG. 3 illustrates a converter 98 that is generally able to carry out these functions and thereby enable an external device 100 to be coupled to USB port 36 on hub or computer 34. The external device may be a joystick, printer, or other legacy external device intended to connect to a computer through any port that is not a USB port. External device 100 includes a cord 102 through which run lines that are terminated in a generally conventional connector plug 104 designed to mate with one of the conventional non-USB ports on computer 38. The dashed lines in FIG. 3 indicate that plug 104 is normally intended to mate with a receptacle 114 on computer 38, thereby permitting external device 100 to communicate with computer 38. Receptacle 114, as noted above, may comprise a serial port, parallel port, game port, PS/2 port, or any other non-USB port on computer 38. Communication between external device 100 and computer 38 may be unidirectional from the computer to the device, or from the device to the computer, or alternatively, may be bi-directional between the device and computer 38.

Converter 98 includes a corresponding receptacle for mating with connector plug 104, having a shape and pin layout generally corresponding to receptacle 114 on computer 38. Receptacle 108 is coupled to a data acquisition circuit 107, which servers as a data interface between the external device and USB port 36. The details of data acquisition circuit 107 will depend upon the type of external device 100 coupled to converter 98, and more specifically, on the format of the data signals it produces and/or expects to receive. If external device 100 is designed to connect to a PS/2 port, data acquisition circuit 107 will include a plurality of open-collector transistors with pull-up resistors (not shown), which will serve as transceivers. If external device 100 is an analog joystick, the data acquisition circuit will include a plurality of resistor-capacitor (RC) timing circuits, or alternatively, an analog-to-digital conversion circuit. An external device 100 designed to produce/receive signals conforming to the RS-232 standard applicable to a conventional serial port will require that the data acquisition circuit provide the appropriate RS-232 voltage levels. A microcontroller 109a disposed in the converter is programmed to control data acquisition circuit 107 to process data and provide or receive any handshaking signals respectively conveyed to and from external device 100. If external device 100 normally communicates with a conventional PS/2 port, the microcontroller will read and write to the transceivers of data acquisition circuit 107 directly, using a subset of the IBM™ PS/2 protocol. If the external device normally communicates using RS-232 serial data, the microcontroller will cause the data acquisition circuit to toggle control lines in cord 102 with the required DTR and CTS signals, in accordance with Microsoft Corporation's Plug and Play specification. If the external device is a gaming control that is normally connected to the game port, the microcontroller should support both analog and digital controls. For an analog game control, it must cause the data acquisition circuit to charge and discharge the RC timing circuits, while for a digital control, it must implement the Microsoft Corporation Digital OverDrive specification for joysticks and game pads.

Converter 98 also includes a USB engine 109b and a USB transceiver 109c. USB engine 109b is connected bi-directionally to USB transceiver 109c. The USB engine and transceiver implement bi-directional communication with USB port 36 via lead 110, which terminates in a 4-pin plug 112 that mates with the USB port.

Lead 110 may be either high speed or low speed as defined by the USB specification, depending on whether a plurality of receptacles are provided within converter 98 to enable the converter to be used with a plurality of external devices 100 at one time. If more than two external devices 100 are connected to converter 98, it is likely that a high speed lead 110 will be required for connection to USB port 36.

In most cases, the full interface specification normally applicable to coupling external device 100 to the conventional non-USB port need not be reproduced by microcontroller 109a. For example, speed shifting, which is provided on a digital game port and on a mouse that is designed to connect to a PS/2 mouse port, although provided on the external device, may safely be ignored by microcontroller 109a. In addition to controlling data acquisition circuit 107, microcontroller 109a converts data into a format that will be usable by USB port 36.

As indicated above, a plurality of external devices may be coupled to converter 98 by providing additional receptacles 108 suitable for mating with the plug coupled by a cord to each such external device. The external devices are thus all coupled to USB port 36 so that data can be exchanged between each such external device and the USB port. To provide this additional functionality, data acquisition circuit 107 must be able to serve as a data interface for each such device. The microcontroller in converter 98 must also contain HID enumeration information for each external device coupled to the converter, and must build the data acquired from each external device into data packets that conform to the chosen HID enumeration values. Similarly, data packets received from the USB port must be converted into the format required by the external device to which it is directed by microcontroller 109a and data acquisition circuit 107 when connector plug 104 is mated with receptacle 114. To accomplish the unidirectional or bi-directional data conversion, microcontroller 109a includes appropriate programming in the form of machine instructions that are stored within a ROM (not shown) on the microcontroller. The microcontroller is coupled to a USB engine 109b, and is capable of receiving signals output by the USB engine for conversion to the required format of external device 100. If multiple devices are connected to converter 98 through additional corresponding receptacle connector plugs 108, an intermediate driver may be required for parsing the data packets into their individual device components within hub or computer 34. These individual device components can then be submitted to higher software layers for use by the operating system or application employing the external device. Microcontroller 109a, USB engine 109b, and USB transceiver 109c will likely be provided as a single monolithic silicon die, although separate components can certainly be used in the alternative.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for selectively operating a game control in a universal serial bus (USB) port mode to transfer data to a USB port of a hub or a computer, or in a game port mode to transfer data to a game port of a computer, comprising the steps of:
   (a) providing an adapter that includes a game port receptacle for coupling to a game port plug on a lead connected to the game control, and a USB port plug for coupling to the USB port;
   (b) producing a type of a signal on a line of the lead connected to the game control that is indicative of whether the game port plug on said lead is connected to the game port receptacle of the adapter or to the game port of the computer; and
   (c) detecting the type of said signal, and in response, automatically operating the game control in a corresponding one of the USB port mode and the game port mode.

2. The method of claim 1, wherein the type of the signal is a reset signal if the game port plug on said lead is connected to the game port receptacle of the adapter and an interrupt signal if the game port plug on said lead is connected to the same port.

3. The method of claim 1, wherein a first of the game port of the computer and the universal serial bus port to produce a signal that is received by the game control after the game control is reset or re-energized determines whether the game control operates in the universal serial bus port mode or in the game port mode.

4. A converter for enabling an external computer peripheral device that is designed to connect to a computer via a cable and a plug attached to the cable, for data transfer through a non-universal serial bus port, to instead transfer data through a universal serial bus port on a hub or on a computer, comprising:
   (a) a receptacle adapted to mate with the plug on the cable attached to the peripheral device;
   (b) a lead that is attached to a universal serial bus plug adapted to mate with the universal serial bus port;
   (c) a universal serial bus transceiver for sending and receiving data respectively to and from the universal serial bus port;
   (d) data interface means for changing a format of data produced by the peripheral device to a format readable by and compatible with the universal serial bus port and for modifying data received from the universal serial bus port to a format that is readable by and compatible with the peripheral device; and
   (e) a programmed controller coupled to the universal serial bus transceiver and to the data interface means, for controlling the exchange of data between the peripheral device and the universal serial bus port.

5. The converter of claim 4, wherein the data interface means convert analog data from the peripheral device to digital data for transfer to the universal serial bus port of the computer.

6. The converter of claim 4, wherein the data interface means convert digital data received from the universal serial bus port of the computer to analog data in the format required by the peripheral device.

7. The converter of claim 4, wherein the programmed controller causes the interface means to provide handshaking signals required by the peripheral device for sending and receiving data to enable the data to be transmitted from and received by the peripheral device.

8. The converter of claim 4, wherein the programmed controller generates timing signals required by the peripheral device for sending and receiving data to enable the data to be transmitted from and received by the peripheral device.

9. The converter of claim 4, further comprising at least a second receptacle adapted to couple a second peripheral device to the converter, to enable the second peripheral device to exchange data with the universal serial bus port through the converter.

10. A system for automatically adaptively coupling a game control in data communication with a universal serial bus (USB) port on a computer or on a hub, or with a game port on the computer, comprising:
   (a) a lead connected to the game control, said lead including a plurality of conductors that are terminated in a connector configured and adapted to electrically couple in data communication with one of a USB port and a game port;
   (b) an adapter including a receptacle configured to electrically couple with said connector and having a plug configured and adapted to electrically couple with the other of the USB port and the game port;
   (c) a terminal within the game control that is connected to one of the conductors within the lead, said terminal having a voltage level that varies as a function of whether one of the plug and the connector is electrically coupled with:
      (i) the USB port, or
      (ii) the game port; and
   (d) a programmed controller coupled to the terminal and responsive to the voltage thereon, said programmed controller being programmed to transmit and receive data formatted for the USB port over the lead if the voltage on the terminal indicates that one of the plug and the connector is electrically coupled to the USB port and otherwise, to transmit and receive data formatted for the game port.

11. The system of claim 10, wherein the voltage is applied to the conductor within the game control, and wherein an impedance across a transistor disposed in the game port causes said voltage to substantially decrease, said voltage remaining substantially constant if said one of the plug and the connector is electrically coupled to the USB port.

12. A system for automatically adaptively coupling a game control in data communication with a universal serial bus (USB) port on a computer or on a hub, or with a game port on the computer, comprising:
   (a) a lead connected to the game control, said lead including a plurality of conductors that are terminated in a connector configured and adapted to electrically couple in data communication with one of a USB port and a game port;
   (b) an adapter including a receptacle configured to electrically couple with said connector and having a plug configured and adapted to electrically couple with the other of the USB port and the game port;
   (c) a plurality of terminals within the game control that are connected to a corresponding plurality of the conductors within the lead, said plurality of terminals receiving signals from one of the USB port and the game port when one of the plug and the connector is electrically coupled thereto; and
   (d) a programmed controller coupled to the plurality of terminals and responsive to a type of a signal first received thereon, said programmed controller being programmed to subsequently operate in a USB mode in which it exchanges data with the USB port over the lead if the type of the signal first received indicates that said one of the plug and the connector is electrically coupled to the USB port and otherwise, to subsequently operate in a game port mode in which it exchanges data with the game port.

13. The system of claim 12, wherein if said one of the plug and the connector is coupled with the USB port, the signal first received is a reset signal generated by the USB port.

14. The system of claim 12, wherein if said one of the plug and the connector is coupled with the game port, the signal first received is an interrupt signal generated by the game port.

15. A method for automatically adaptively coupling a game control in data communication with a universal serial bus (USB) port on a computer or on a hub, or with a game port on the computer, through a lead that is terminated in a connector that is adapted to couple with one of the game port and the USB port, comprising the steps of:
   (a) providing an adapter including a receptacle configured to electrically couple with said connector and a plug configured and adapted to electrically couple with the other of the game port and the USB port;
   (b) sensing a voltage level that varies as a function of whether said one of the plug and the connector is electrically coupled:
      (i) with the USB port, or
      (ii) with the game port; and
   (c) exchanging data formatted for the USB port between the game control and the USB port, if the voltage indicates that said one of the plug and the connector is electrically coupled to the USB port, and otherwise, exchanging data formatted for the game port between the game control and the game port.

16. The method of claim 15, wherein the voltage is applied to a conductor of the lead within the game control, and wherein an impedance at the game port causes said voltage to substantially decrease if said one of the plug and the connector is coupled with the game port, said voltage remaining substantially constant if said one of the plug and the connector is electrically coupled to the USB port.

17. A method for automatically adaptively coupling a game control in data communication with a universal serial bus (USB) port on a computer or on a hub, or with a game port on the computer, through a lead that is terminated in a connector adapted to couple with one of the USB port and the game port, comprising the steps of:
   (a) providing an adapter including a receptacle configured to electrically couple with said connector and having a plug configured and adapted to electrically couple with the other of the USB port and the game port;
   (b) receiving signals from one of the USB port and the game port, at the game control, when said one of the plug and the connector is electrically coupled thereto; and
   (c) responding to a type of a signal first received from said one of the USB port and the game port, said game control subsequently operating in a USB mode for exchanging data with the USB port if the type of the signal first received indicates that said one of the plug and the connector is electrically coupled to the USB port, and otherwise, subsequently operating in a game port mode for exchanging data with the game port.

18. The method of claim 17, wherein if said one of the plug and the connector is coupled with the USB port, the signal first received is a reset signal generated by the USB port.

19. The method of claim 17, wherein if said one of the plug and the connector is coupled with the game port, the signal first received is an interrupt signal generated by the game port.

* * * * *